(12) United States Patent
Ryu et al.

(10) Patent No.: US 12,245,064 B2
(45) Date of Patent: Mar. 4, 2025

(54) TECHNIQUES FOR CROSS-CHANNEL INTERFERENCE MEASUREMENT IN WIRELESS COMMUNICATIONS

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Ling Ding, Chester, NJ (US); Jelena Damnjanovic, Del Mar, CA (US); Juan Montojo, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 17/150,429

(22) Filed: Jan. 15, 2021

(65) Prior Publication Data

US 2021/0266772 A1    Aug. 26, 2021

Related U.S. Application Data

(60) Provisional application No. 62/979,302, filed on Feb. 20, 2020.

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC . H04W 24/10; H04W 24/08; H04W 72/1231; H04W 72/0453
See application file for complete search history.

(56) References Cited

U.S. PATENT DOCUMENTS

2019/0132023 A1* 5/2019 Tokgoz ................. H04W 16/14
2019/0215086 A1* 7/2019 Kwak .................... H04B 17/24
(Continued)

FOREIGN PATENT DOCUMENTS

CN      110383738 A      10/2019
EP       3661255 A1       6/2020
(Continued)

OTHER PUBLICATIONS

International Search Report and Written Opinion—PCT/US2021/013936—ISA/EPO—May 10, 2021.
(Continued)

*Primary Examiner* — Walli Z Butt
*Assistant Examiner* — Thad N Defauw
(74) *Attorney, Agent, or Firm* — ArentFox Schiff LLP

(57) ABSTRACT

Aspects described herein relate to determining and/or scheduling resources for devices in view of cross-channel interference measured between the devices. In an aspect, a first user equipment (UE) can determine a signal measurement of a signal transmitted by a second UE in a first channel, determine, based at least in part on the signal measurement, a cross-channel interference parameter of interference experienced by the first UE, and transmit, to a serving base station that serves the first UE, an indication of the cross-channel interference parameter. In another aspect, a base station can determine a cross-channel interference parameter of interference experienced by a first UE in at least a first channel, based on a signal transmitted by a second UE in a second channel, and can schedule communications for the first UE based at least in part on the cross-channel interference parameter.

30 Claims, 7 Drawing Sheets

(56) References Cited

U.S. PATENT DOCUMENTS

| | | | |
|---|---|---|---|
| 2020/0022089 A1* | 1/2020 | Guo | H04W 52/26 |
| 2020/0177291 A1* | 6/2020 | Fei | H04W 72/0453 |
| 2020/0260463 A1* | 8/2020 | Lovlekar | H04W 76/15 |
| 2021/0067282 A1* | 3/2021 | Yan | H04W 48/10 |
| 2021/0112564 A1* | 4/2021 | McConnell | H04W 72/0453 |

FOREIGN PATENT DOCUMENTS

| | | |
|---|---|---|
| WO | 2018031189 A1 | 2/2018 |
| WO | 2019029353 A1 | 2/2019 |
| WO | 2019236733 A1 | 12/2019 |

OTHER PUBLICATIONS

LG Electronics: "TP on 5G V2X UE RF Requirements for SL Operation at Licensed Whole Band", 3GPP Draft, R4-1916144, 3GPP TSG RAN WG4 #93 meeting, 3rd Generation Partnership Project (3GPP), Mobile Competence Centre, 650, Route Des Lucioles, F-06921 Sophia-Antipolis Cedex, France vol. RAN WG4, No. Reno, Nevada, U.S, Nov. 18, 2019-Nov. 22, 2019, Nov. 24, 2019 (Nov. 24, 2019), XP051830499, 14 Pages, pp. 2-7, 8 Transmitter characteristics.

Qualcomm Incorporated: "TP to TR38.831: Emissions Requirements for FR2 NC UL CA", 3GPP Draft, 3GPP TSG-RAN4 #92-Bis, R4-1910766, R4-1913043_NC_ULCA_Emissions, 3rd Generation Partnership Project (3GPP), Mobile Competence Centre, 650, Route Des Lucioles, F-06921 Sophia-Antipolis Cedex, France vol. RAN WG4, No. Chongqing, CN, Oct. 14, 2019-Oct. 18, 2019, Oct. 22, 2019 (Oct. 22, 2019), XP051798453, 9 Pages, pp. 7-9, 6.5A.2 Out of Band Emissions.

Qualcomm Incorporated: "TP to TR38.831: Emissions Requirements for FR2 NC UL CA", 3GPP TSG-RAN4 #92-Bis, R4-1910766, Chongqing, CN, Oct. 14-18, 2019, Oct. 22, 2019, XP051798453, 9 Pages.

* cited by examiner

TECHNIQUES FOR CROSS-CHANNEL INTERFERENCE MEASUREMENT IN WIRELESS COMMUNICATIONS

CLAIM OF PRIORITY UNDER 35 U.S.C. § 119

The present Application for patent claims priority to Provisional Patent Application No. 62/979,302, entitled "TECHNIQUES FOR CROSS-CHANNEL INTERFERENCE MEASUREMENT IN WIRELESS COMMUNICATIONS" filed Feb. 20, 2020, which is assigned to the assignee hereof and hereby expressly incorporated by reference herein for all purposes.

BACKGROUND

Aspects of the present disclosure relate generally to wireless communication systems, and more particularly, to measuring cross-channel interference in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, devices, such as user equipment (UEs), can communicate with a wireless network via base stations or gNBs over an access link. The devices can also communicate with one another directly over a sidelink. In either case, the devices can use beamforming to transmit signals to the network or to other devices, such that the devices can selectively apply power to antenna resources to generate a beam in a desired spatial direction. In addition, different devices can be configured for access link or sidelink communications in physical resource blocks (PRBs) that are adjacent in frequency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining, by a first user equipment (UE), a signal measurement of a signal transmitted by a second UE in a first channel, determining, based at least in part on the signal measurement, a sidelink cross-channel interference parameter of interference experienced by the first UE in at least a second channel that is with a frequency span of the first channel, and transmitting, by the first UE and to a serving base station that serves the first UE, an indication of the sidelink cross-channel interference parameter.

In another example, a method for wireless communication is provided. The method includes determining a sidelink cross-channel interference parameter of interference experienced by a first UE in at least a first channel, based on a signal transmitted by a second UE in a second channel, wherein the second channel is within a frequency span of the first channel, and scheduling communications for the first UE based at least in part on the sidelink cross-channel interference parameter.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an example, an apparatus for wireless communication is provided that includes a transceiver, a memory configured to store instructions, and one or more processors communicatively coupled with the memory and the transceiver. The one or more processors are configured to determine a signal measurement of a signal transmitted by a second device in a first channel, determine, based at least in part on the signal measurement, a cross-channel interference parameter of interference experienced by the apparatus in at least a second channel that is within a frequency span of the first channel, and transmit, to a serving base station that serves the apparatus, an indication of the cross-channel interference parameter.

In another example, an apparatus for wireless communication is provided that includes a transceiver, a memory configured to store instructions, and one or more processors communicatively coupled with the memory and the transceiver. The one or more processors are configured to determine a cross-channel interference parameter of interference experienced by a first UE in at least a first channel, based on a signal transmitted by a second UE in a second channel, wherein the second channel is within a frequency span of the first channel, and schedule communications for the first UE based at least in part on the cross-channel interference parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
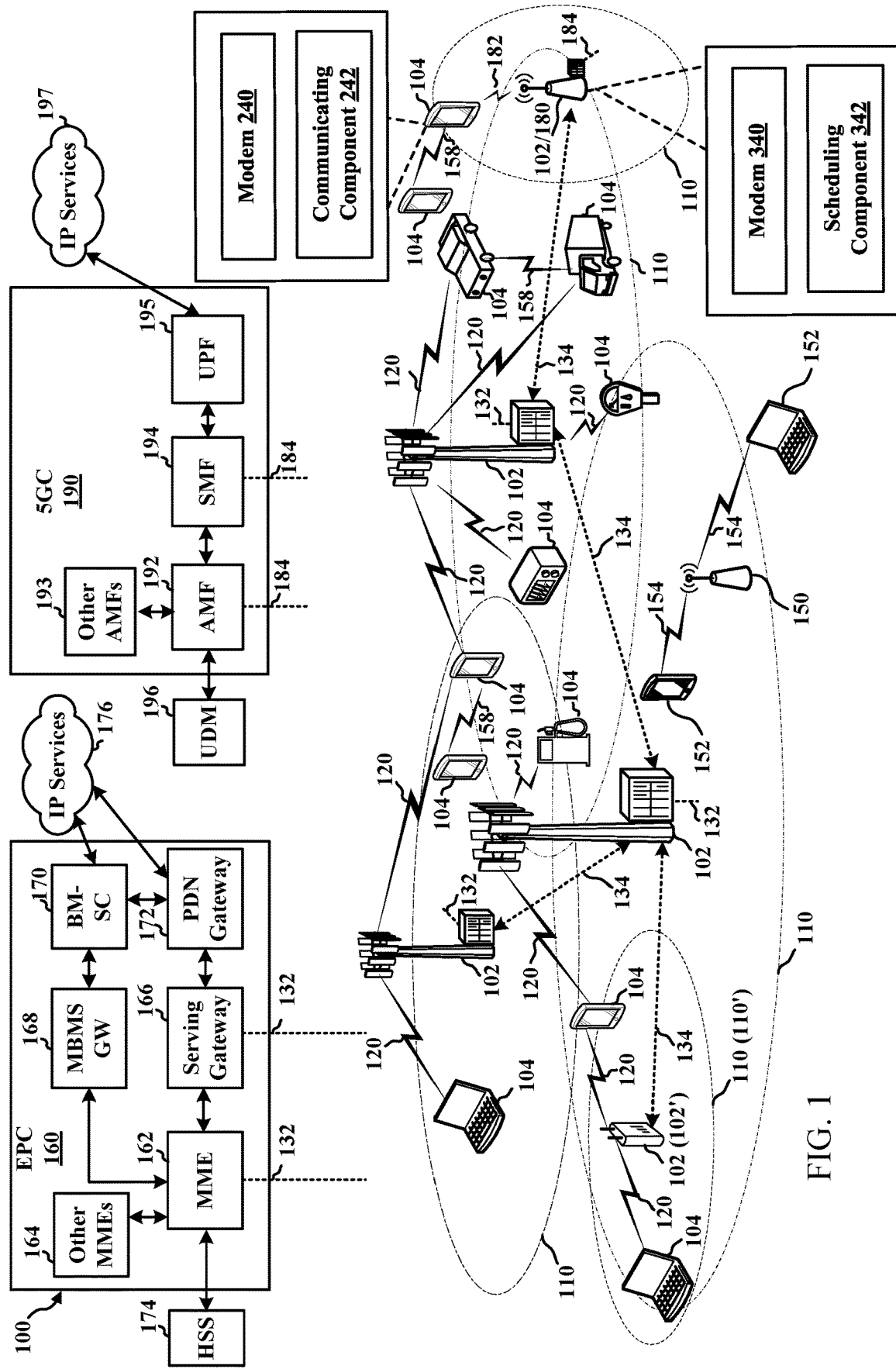
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining a cross-channel interference parameter associated with communications for a device, and/or scheduling communications for the device based on the determined cross-channel interference parameter. For example, the cross-channel interference parameter for a device can be determined based on a signal measurement by the device of a signal transmitted by a second device. Resources can be scheduled for at least one of the first device or the second device based on the cross-channel interference parameter to mitigate cross-channel interference among the devices.

In an example, the resources can be related to an access link between the one or more devices and a network (e.g., between the one or more devices and a gNB), a sidelink directly between the one or more devices, etc. Moreover, the devices can include user equipment (UEs) or devices with a UE function, such as an integrated access and backhaul (IAB) node, etc. In addition, in time division duplexing (TDD), a gNB can schedule uplink (UL) slots for UL transmissions from the UE to gNB and sidelink transmissions from UE to another UE (e.g., in mode 1 operation, where gNB schedules sidelink (SL) activities).

For example, the frequency resources of channels allocated to different devices can potentially cause interference to one another where the channels are adjacent frequency channels, or at least within a threshold span or difference in frequency, etc. For example, when a device transmits a signal in a physical resource block (PRB) (e.g., PRB1), the transmit power is not confined within PRB1, as some transmit power leaks into adjacent PRBs. Adjacent channel leakage may not be desirable as this can cause interference to reception in adjacent PRBs by any nearby receiver devices (e.g., where the transmission and reception occur in a same or similar or overlapping time period). In access link communications, this may not be a concern, as UEs on the access link can transmit communications to a base station in uplink (UL) slot or symbol, or receive communications from the base station in downlink (DL) slot or symbol. In sidelink communications, however, a device can transmit or receive in a given slot or symbol. In addition, in sidelink devices can be very close in proximity, so adjacent channel leakage from one device transmitting in one PRB can be received at high enough power by another nearby device receiving in adjacent PRB to cause interference.

In this regard, for example, where a base station knows scheduling UL access link communications or sidelink (SL) communications in certain resources (e.g., PRB1 in the example above) may cause interference to receiving SL communications in different resources (e.g., PRB 2 in the example above based on determining that PRB1 and PRB2 are close in frequency, and/or that corresponding resources may at least partially overlap in time), the base station can avoid interference by not scheduling the two activities at the same time or scheduling them in resources (e.g., PRBs) that are spaced farther apart in frequency. The base station can determine, or receive a determination of, a cross-channel interference parameter between devices, and can accordingly schedule one or more of the devices based on the cross-channel interference parameter. This can help to mitigate interference in device communications, which can improve throughput at the devices, channel quality, spectrum resource usage, etc.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably.

A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for indicating a signal measurement of a signal from another UE or a cross-channel interference parameter, in accordance with aspects described herein, and some nodes may have a modem 340 and scheduling component 342 for scheduling communications for one or more UEs based on a determined cross-channel interference parameter associated with the one or more UEs, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can communicate with other UEs over a sidelink, communicate with a gNB over an access link, etc. In one example, communicating component 242 can determine a signal measurement of a signal received from another UE over a channel, and can report the signal measurement to a base station 102. In another example, communication component 242 can determine a cross-channel interference parameter based on the signal measurement for reporting to the base station 102. In either case, scheduling component 342 can receive the signal measurement and determine a cross-channel interference parameter for the UE 104 (or receive the cross-channel interference parameter from the UE 104), and/or can schedule resources for the UE 104 based on the cross-channel interference parameter to prevent or mitigate cross-channel interference from one or more other UEs in communications of the UE 104.

Figure 2:
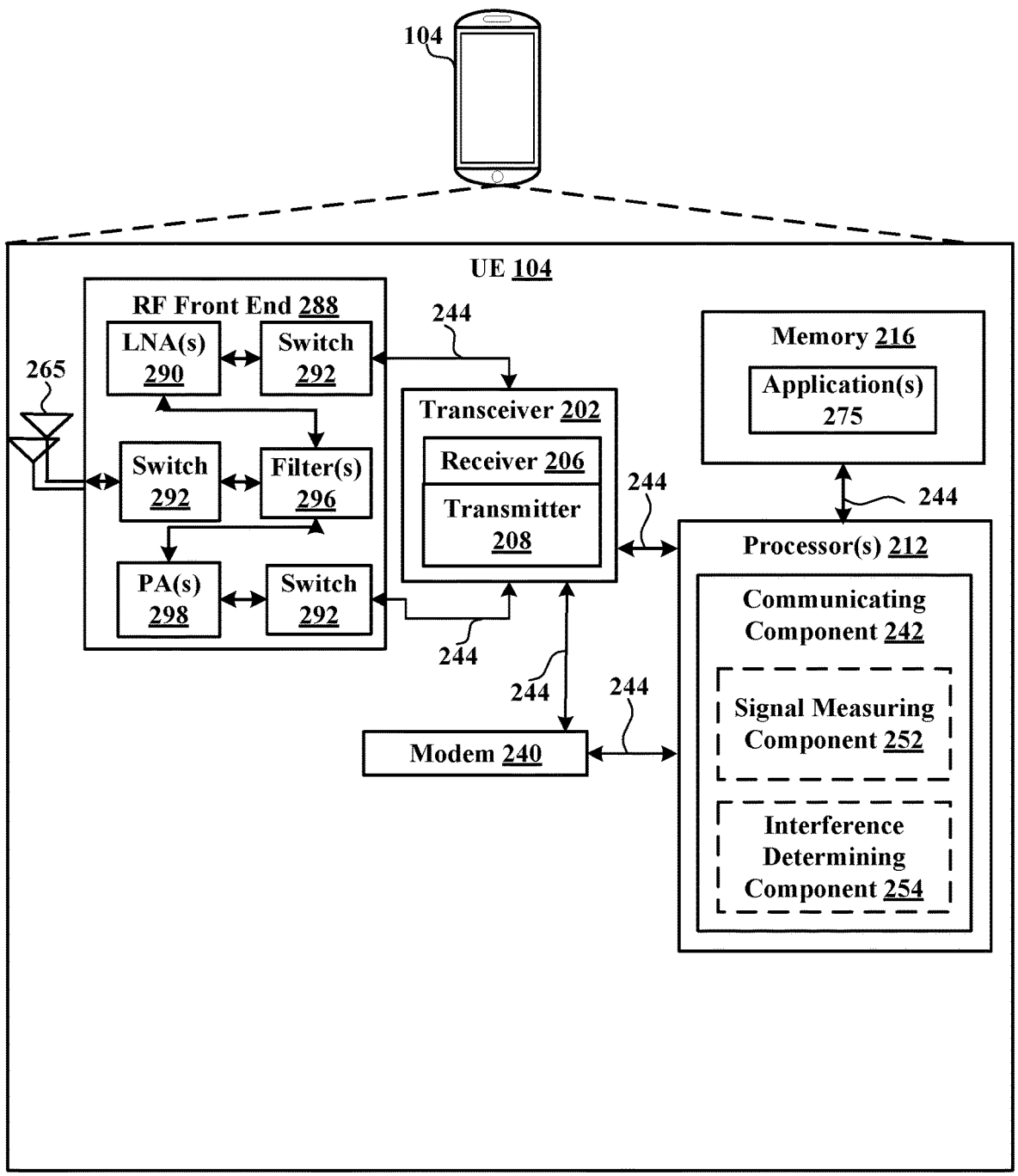
FIG. 2 is a block diagram illustrating an example of a UE, in accordance with various aspects of the present disclosure.
Figure 3:
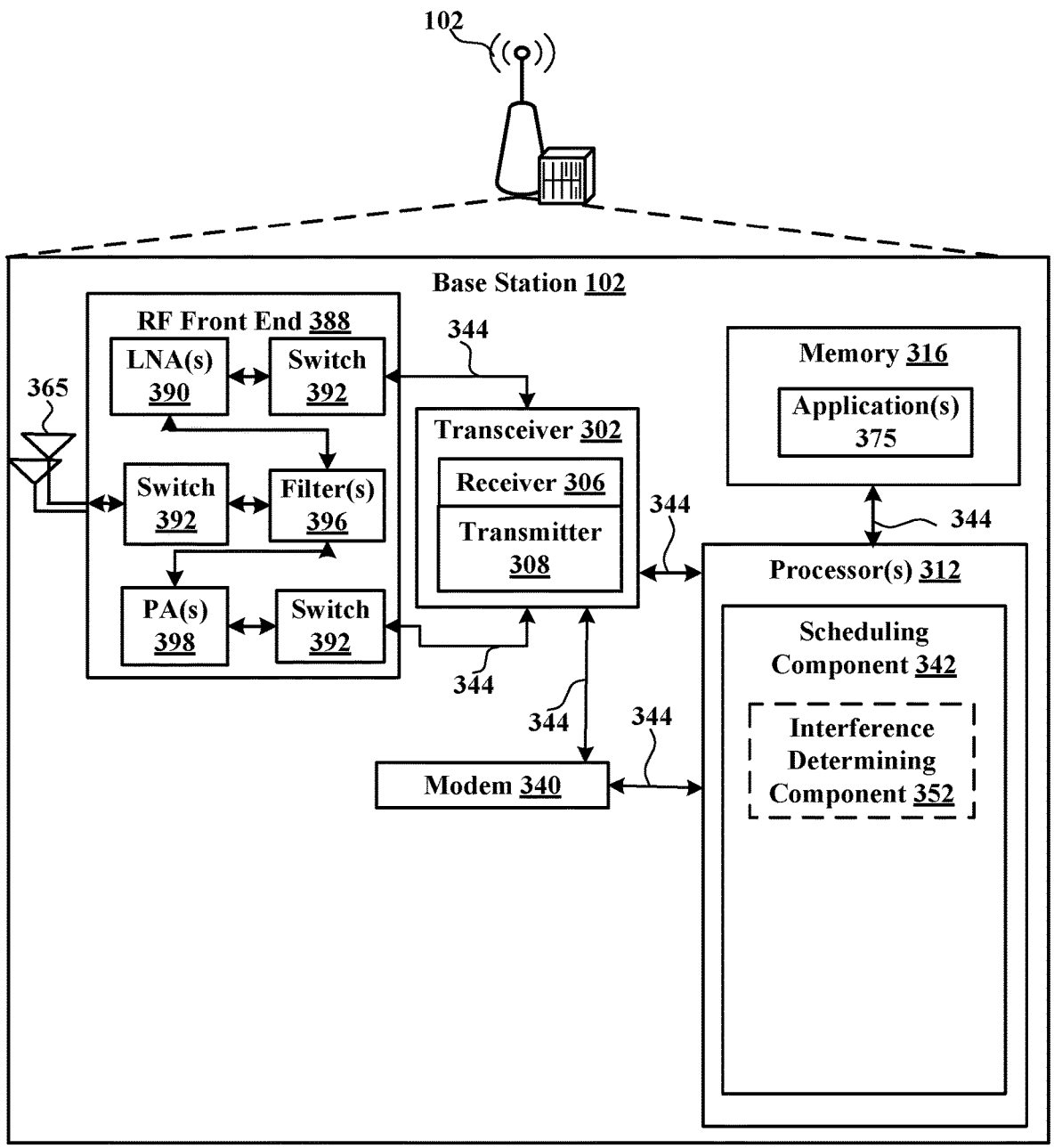
FIG. 3 is a block diagram illustrating an example of a base station, in accordance with various aspects of the present disclosure.
Figure 4:
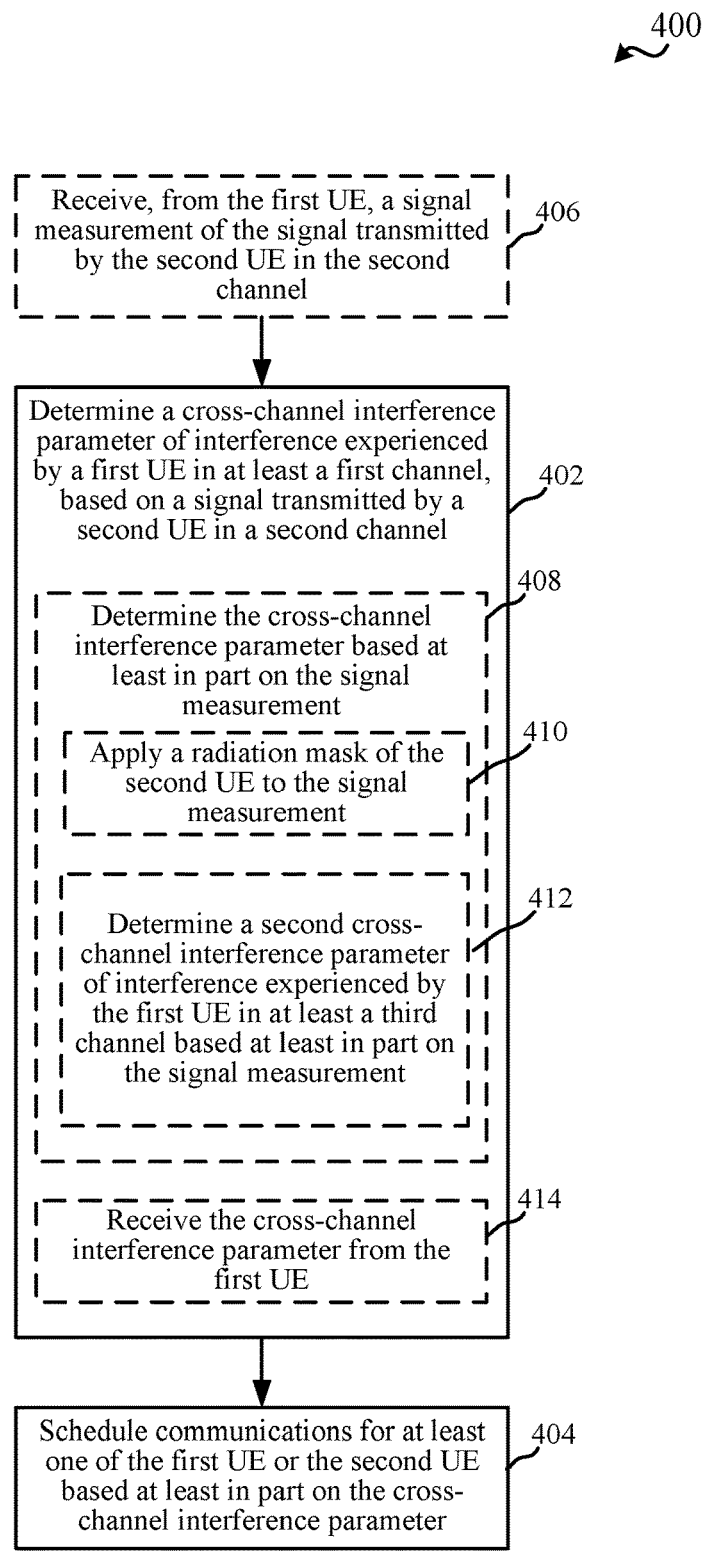
FIG. 4 is a flow chart illustrating an example of a method for scheduling resources for devices based on determining cross-channel interference between the devices, in accordance with various aspects of the present disclosure.
Figure 5:
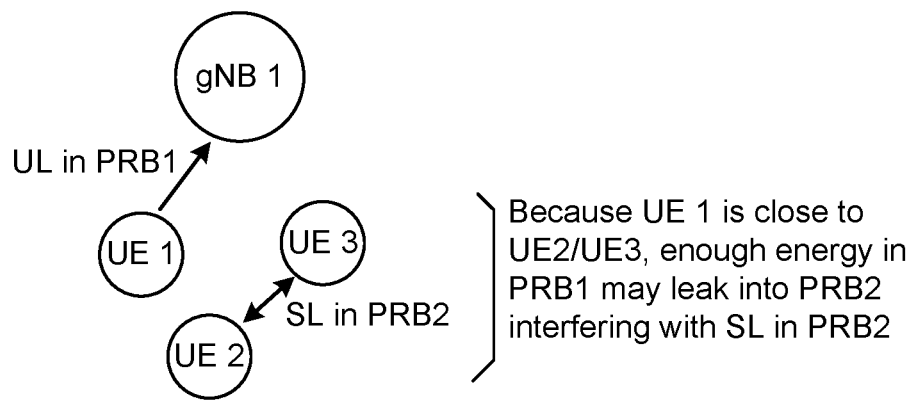
FIG. 5 illustrates examples of systems with different scenarios for determining cross-channel interference of devices in adjacent resource blocks, in accordance with various aspects of the present disclosure.
Figure 5:
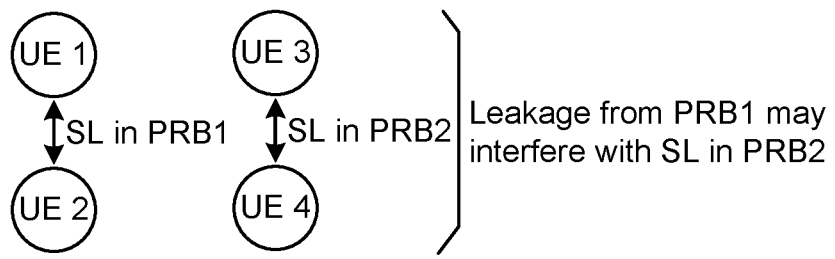
Figure 6:
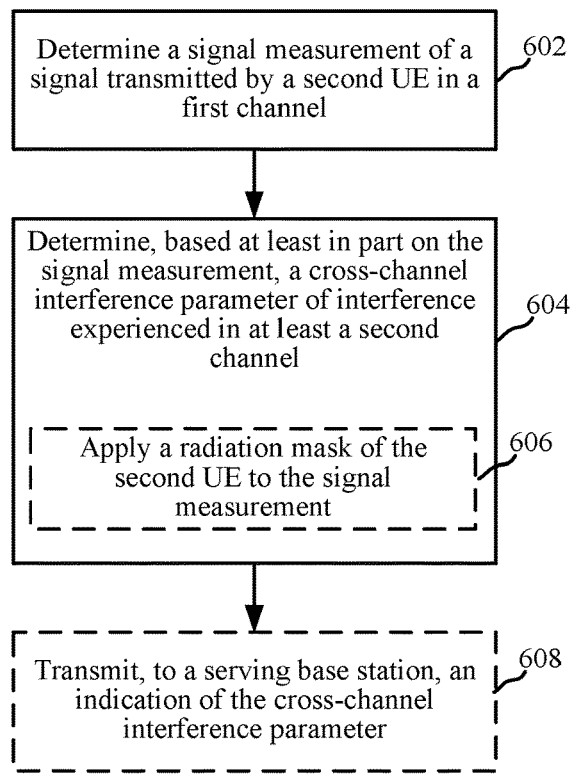
FIG. 6 is a flow chart illustrating an example of a method for determining a cross-channel interference parameter of a device, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating with one or more UEs over a sidelink, communicating with a base station over an access link, measuring and/or reporting a signal measurement of a signal received from one or more UEs, determining and/or reporting a cross-channel interference parameter based on the signal measurement, etc., as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a signal measuring component 252 for measuring a signal received from one or more other UEs to determine a signal measurement and/or reporting the signal measurement, and/or an interference determining component 254 for determining a cross-channel interference parameter based on the signal measurement and/or reporting the cross-channel interference parameter, etc., as described further herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling communications for one or more UEs based on a cross-channel interference parameter determined for the one or more UEs, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include an interference determining component 352 for determining a cross-channel interference parameter for one or more UEs, whether by receiving the cross-channel interference parameter from the one or more UEs, determining the cross-channel interference parameter based on signal measurements received from the one or more UEs, and/or the like, as described further herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for scheduling communications for a UE based on a cross-channel interference parameter determined for the UE or another UE. In an example, a base station 102/gNB 180 can perform the functions described in method 400 using one or more of the components described in FIGS. 1 and 3. Though aspects are described generally in terms of a base station 102 performing the functions, a gNB 180 can be the base station 102 or can otherwise be similarly configured to perform the functions described herein.

In method 400, at Block 402, a cross-channel interference parameter of interference experienced by a first UE in at least a first channel, based on a signal transmitted by a second UE in a second channel, can be determined. In an aspect, interference determining component 352, e.g., in conjunction with processor(s) 312, memory 316, transceiver 302, scheduling component 342, etc., can determine the cross-channel interference parameter of interference experienced by the first UE in at least the first channel, based on the signal transmitted by the second UE in the second channel. For example, the cross-channel interference parameter may include a sidelink cross-channel interference parameter related to cross-channel interference that may be caused over sidelink communications of the first UE from signals transmitted by the second UE in adjacent frequency resources, or at least frequency resources within a threshold frequency span.

In an example, the adjacent frequency resources can include adjacent channels defined in a wireless communication technology, adjacent PRBs defined in a wireless communication technology, etc. For example, interference determining component 352 can determine the frequency resources to be adjacent based on one or more properties of the resources, of an associated channel, of corresponding PRBs, etc. For example, interference determining component 352 can determine frequency resources to be adjacent based on channel number (e.g., E-UTRA absolute radio frequency channel number (EARFCN)), where the channel numbers are sequential or otherwise known to be in adjacent frequency resources. In another example, interference determining component 352 can determine frequency resources to be adjacent based on PRB index, where the PRB Indices are sequential or otherwise known to be adjacent in frequency resources, etc. In addition, for example, the threshold frequency span can be configured by the network or specified in a radio access technology standard (and accordingly stored in memory 316), etc. The threshold frequency span may be in units of megahertz (MHz), resource blocks (e.g., PRBs), resource elements, subcarriers, channel numbers, or other measure of frequency, and/or may be equal to zero for adjacency requirement.

For example, communications transmitted by the second UE in the second channel can cause cross-link interference to communications of the first channel by the first UE (e.g., communications received in the first channel by the first UE), at least where the communications overlap at least partially in time. For example, communications can overlap in time where the communications overlap in one or more orthogonal frequency division multiplexing (OFDM) symbols, single carrier frequency division multiplexing (SC-FDM) symbols, one or more slots of multiple symbols, one or more transmission time intervals (TTIs) of one or more symbols or slots, or other time division that may be defined by a radio access technology. In this regard, interference determining component 352 can determine the cross-channel interference parameter based on the signal transmitted by the second UE, and may accordingly determine whether to schedule communications for the first UE and/or second UE based on the cross-channel interference parameter, as described further herein. For example, the cross-channel interference parameter may include an indication of cross-channel interference, a measurement of cross-channel interference or signal strength (e.g., in decibels) of the signal received from the second UE, etc. An example is shown in FIG. 5.

FIG. 5 illustrates examples of systems 500, 502 with UEs having transmissions that potentially interfere with one another due to adjacent channel leakage. In system 500, though UE1 may use a different PRB (PRB1) for UL than UE2 and UE3 use for SL communications (PRB2), because UE1 is close enough to UE2 and/or UE3 (and where PRB1 and PRB2 are adjacent or within a threshold span of frequency), enough energy from the transmission of UE1 may leak into PRB2 to cause interference for the SL communication. In this example, interference determining component 352 can determine a measure of possible cross-channel interference based on signal measurements received from UE2 and/or UE3 for signals transmitted by UE1. For example, scheduling component 342 may schedule SL resources for UE2 and/or UE3 based on the measure of possible cross-channel interference. For example, scheduling component 342 may schedule the resources to avoid cross-channel interference by refraining from scheduling UE1 UL transmissions in the same time period as UE2 and/or UE3 SL communications, by scheduling UE1 UL transmissions in PRBs that are not adjacent or are otherwise further spaced from PRB2 on which UE2 and/or UE3 are scheduled for SL communications, etc.

In system 502, though UE1 may use a different PRB (PRB1) for SL transmission with UE2 than UE3 and UE4 use for SL communications (PRB2), because UE1 and/or UE2 are close enough to UE3 and/or UE4 (and where PRB1 and PRB2 are adjacent or within a threshold span of frequency), enough energy from the transmission of UE1 and/or UE2 may leak into PRB2 to cause interference for the SL communication, and the transmission of UE3 and/or UE4 may leak into PRB1 to cause interference for the UE1-UE2 SL communication. In this example, interference determining component 352 can determine a measure of possible cross-channel interference based on signal measurements received from UE3 and/or UE4 for signals transmitted by UE1 and/or UE2. For example, scheduling component 342 may schedule SL resources for UE3 and/or UE4 based on the measure of possible cross-channel interference. For example, scheduling component 342 may schedule the resources to avoid cross-channel interference by refraining from scheduling UE1 and/or UE2 SL transmissions in the same time period as UE3 and/or UE4 SL communications, by scheduling UE1 and/or UE2 SL transmissions in PRBs that are not adjacent or are otherwise further spaced from PRB2 on which UE3 and/or UE4 are scheduled for SL communications, etc.

In method 400, at Block 404, communications for at least one of the first UE or the second UE can be scheduled based at least in part on the cross-channel interference parameter. In an aspect, scheduling component 342, e.g., in conjunction with processor(s) 312, memory 316, transceiver 302, etc., can schedule communications for at least one of the first UE or the second UE based at least in part on the cross-channel interference parameter. For example, scheduling component 342 can, based at least in part on the cross-channel interference parameter, refrain from scheduling first resources for the first UE where the first resources at least partially overlap in time with second resources scheduled for the second UE to transmit communications over an access link or sidelink. In addition, for example, scheduling component 342 can refrain from scheduling the first resources for the first UE based additionally on determining that the first resources are adjacent in frequency to (or are not at least a threshold amount of frequency away from) the second resources. In this example, scheduling component 342 can refrain from scheduling the first resources for the first UE based on determining that the first resources are in a first PRB or channel that is adjacent to (or not at least a threshold amount of frequency or PRBs away from) a second PRB or channel of the second resources. Said differently, in an alternative example, scheduling component 342 can, based at least in part on the cross-channel interference parameter, schedule the first resources for the first UE based on determining that the first resources are associated with a PRB or channel that is not adjacent to (or is at least a threshold amount of frequency away from) a second PRB or channel associated with the second resources regardless of whether the first resources and second resources overlap in time.

In another example, scheduling component 342 can schedule first resources for communications of the first UE and can, based at least in part on the cross-channel interference parameter, refrain from scheduling second resources for transmissions of the second UE where the first resources at least partially overlap in time with second resources. In addition, for example, scheduling component 342 can refrain from scheduling the second resources for the second UE based additionally on determining that the second resources are associated with a frequency (e.g., a PRB or channel) that is adjacent to (or is not at least a threshold amount of frequency away from) a first frequency (e.g., a first PRB or channel) associated with the first resources.

In method 400, optionally at Block 406, a signal measurement of the signal transmitted by the second UE in the second channel can be received from the first UE. In an aspect, interference determining component 352, e.g., in conjunction with processor(s) 312, memory 316, transceiver 302, scheduling component 342, etc., can receive, from the first UE, the signal measurement of the signal transmitted by the second UE in the second channel. For example, interference determining component 352 can receive the signal measurement from the first UE as a measurement performed in the second channel over which the second UE transmits the signal or as a measurement performed in the first channel that is used by the UE for communicating in the network (e.g., for sidelink communications that may be potentially interfered by transmissions of the second UE). For example, the signal measurement may be a measure of reference signal received power (RSRP) or other metric (e.g., reference signal received quality (RSRQ), received signal strength indicator (RSSI), signal-to-noise ratio (SNR), etc.) of the signal transmitted by the second UE. For example, the signal transmitted by the second UE that is measured by the first UE may include a CSI-RS or other reference signal.

Moreover, in an example, interference determining component 352 can request the second UE to transmit the signal (e.g., as a CSI-RS), the second UE can transmit the signal (e.g., at power P), and the interference determining component 352 can request the first UE to measure the signal (e.g., over the first or second channel), such as to measure RSRP of the signal (e.g., of the CSI-RS). In addition, the second UE can transmit the CSI-RS using a known or configured transmit beam, and the first UE can attempt to receive and measure the CSI-RS using a receive beam in the same frequency resource block. In this example, the first device can know whenever the second device transmits any signal at power P using a certain transmit beam and the first device uses a certain receive beam, the first device can receive the signal at the measured RSRP in the frequency block.

In this example, in determining the cross-channel interference parameter at Block 402, optionally at Block 408, the cross-channel interference parameter can be determined based at least in part on the signal measurement. In an aspect, interference determining component 352, e.g., in conjunction with processor(s) 312, memory 316, transceiver 302, scheduling component 342, etc., can determine the cross-channel interference parameter based at least in part on the signal measurement. For example, interference determining component 352 can determine the cross-channel interference parameter as one of an indicator that cross-channel interference exists between the first UE and the second UE (e.g., where the signal measurement achieves a threshold), or as an amount of cross-channel interference (e.g., based on the signal measurement).

In one example, where the signal measurement received at Block 406 is a measurement in the first channel of the signal transmitted by the second UE in the second channel, this measurement can be a direct measurement of the cross-channel interference, and interference determining component 352 can determine the cross-channel interference as the measurement or otherwise based on the measurement itself (e.g., based on the measurement value, which may be indicated in decibels or other unit of signal strength or quality measurement). In another example, where the signal measurement received at Block 406 is a measurement in the second channel over which the second UE transmits the signal, interference determining component 352 can apply additional parameters to the signal measurement to determine the cross-channel interference.

In an example, in determining the cross-channel interference parameter at Block 408, optionally at Block 410, a radiation mask of the second UE can be applied to the signal measurement. In an aspect, interference determining component 352, e.g., in conjunction with processor(s) 312, memory 316, transceiver 302, scheduling component 342, etc., can apply the radiation mask of the second UE to the signal measurement. For example, the radiation mask can correspond to a radiation emission mask defined in a wireless communication technology, such as 3GPP. For example, 3GPP can specify that UE's of certain class must meet emission requirements, and the UE must not emit more than a number, X, of decibel milliwatt (dBm) in non-allocated RBs when transmitting a number, Y, of dBm in allocated RBs. In this example, interference determining component 352 can combine the signal measurement with the radiation emission mask to determine a maximum amount of possible cross-channel interference from the second UE, which can be used to determine the cross-channel interference parameter (e.g., as the maximum amount of possible cross-channel interference, as an indicator of cross-channel interference where the maximum amount of possible cross-channel interference achieves a threshold, etc.).

In an example, in determining the cross-channel interference parameter at Block 408, optionally at Block 412, a second cross-channel interference parameter of interference experienced by the first UE in at least a third channel based at least in part on the signal measurement can be determined. In an aspect, interference determining component 352, e.g., in conjunction with processor(s) 312, memory 316, transceiver 302, scheduling component 342, etc., can determine the second cross-channel interference parameter of interference experienced by the first UE in at least the third channel based at least in part on the signal measurement. For example, the third channel can be another channel that is adjacent to the second channel, but is not the first channel. For example, the third channel can be on the other side of the second channel from the first channel in frequency, such that the channels are ordered in frequency where the first channel is adjacent to, or within a threshold frequency span of, the second channel, and the second channel is adjacent to, or within the threshold frequency span of, the third channel (e.g., the first channel occupies a lower frequency than the second channel, and the second channel occupies a lower frequency than the third channel). Similarly, interference determining component 352 can determine this second cross-channel interference parameter as at least one of a direct measurement of the cross-channel interference caused by the signal from the second UE, as measured from the third channel, or based on applying the radiation mask to the signal measurement as measured in the second channel. In either case, interference determining component 352 can determine the cross-channel interference based on the measurements related to the first channel and/or based on the second cross-channel interference parameter determined based on the measurements related to the third channel.

In another example, in determining the cross-channel interference parameter at Block 402, optionally at Block 414, the cross-channel interference parameter can be received from the first UE. In an aspect, interference determining component 352, e.g., in conjunction with processor(s) 312, memory 316, transceiver 302, scheduling component 342, etc., can receive the cross-channel interference parameter from the first UE. As described further herein, for example, the UE can determine the cross-channel interference parameter based on the signal measurements performed by the first UE, and can transmit the cross-channel interference parameter to the base station 102 (e.g., rather than base station 102 computing the cross-channel interference parameter). Similarly, in this regard, the cross-channel interference parameter received from the first UE may include an indicator that cross-channel interference exists, a measure of the cross-channel interference, etc.

FIG. 6 illustrates a flow chart of an example of a method 600 for determining and communicating a cross-channel interference parameter. In an example, a UE 104 can perform the functions described in method 600 using one or more of the components described in FIGS. 1-2.

In method 600, at Block 602, a signal measurement of a signal transmitted by a second UE in a first channel can be determined. In an aspect, signal measuring component 252, e.g., in conjunction with processor(s) 212, memory 216, transceiver 202, communicating component 242, etc., can determine the signal measurement of the signal transmitted by the second UE in the first channel. For example, signal measuring component 252 can measure the signal transmitted by the second UE as a measurement in the first channel or as a measurement of the first channel transmission of the second UE taken from a second channel in which the UE 104 communicates (e.g., with a base station over an access link or with a third UE over a sidelink). In addition, for example, signal measuring component 252 can measure RSRP, RSRQ, RSSI, SNR, or other measurements of the signal, as described, and/or may measure the signal based on a request received from a base station 102 to measure the signal for the purpose of determining cross-channel interference caused at the UE 104 (e.g., over the second channel) by transmissions from the second UE in the first channel.

In method 600, at Block 604, a cross-channel interference parameter of interference experienced in at least a second channel can be determined based at least in part on the signal measurement. In an aspect, interference determining component 254, e.g., in conjunction with processor(s) 212, memory 216, transceiver 202, communicating component 242, etc., can determine, based at least in part on the signal measurement, the cross-channel interference parameter of interference experienced in at least a second channel. For example, the second channel can be adjacent in frequency to the first channel (e.g., in an adjacent PRB or channel) or otherwise close enough in frequency that signals transmitted over the first channel may interfere communications in the second channel (e.g., within a threshold frequency span, as described above). In one example, interference determining component 254 can determine the cross-channel interference as a direct measurement of the signal transmitted by the second UE in the first channel and received in the second channel. In another example, interference determining component 254 can determine the cross-channel interference based on the signal transmitted by the second UE as received in the first channel. In this example, interference determining component 254 can apply one or more other parameters to the signal measurement to determine the cross-channel interference.

For example, in determining the cross-channel interference parameter at Block 604, optionally at Block 606, a radiation mask of the second UE can be applied to the signal measurement. In an aspect, interference determining component 254, e.g., in conjunction with processor(s) 212, memory 216, transceiver 202, communicating component 242, etc., can apply the radiation mask of the second UE to the signal measurement. For example, the radiation mask can correspond to a radiation emission mask defined in a wireless communication technology, such as 3GPP. For example, 3GPP can specify that UE's of certain class must meet emission requirements, and the UE must not emit more than a number, X, of dBm in non-allocated RBs when transmitting a number, Y, of dBm in allocated RBs. In this example, interference determining component 254 can combine the signal measurement with the radiation emission mask to determine a maximum amount of possible cross-channel interference from the second UE, and/or whether the signal transmitted by the second UE exceeds the maximum amount of cross-channel interference.

In method 600, optionally at Block 608, an indication of the cross-channel interference parameter can be transmitted to a serving base station. In an aspect, interference determining component 254, e.g., in conjunction with processor(s) 212, memory 216, transceiver 202, communicating component 242, etc., can transmit, to the serving base station (e.g., base station 102), the indication of the cross-channel interference parameter. As described, for example, the indication can include at least one of an indication of whether cross-channel interference exists between the UE 104 and the second UE, a measure of the cross-channel interference as a direct measurement or as a measurement over the first channel with emission mask applied, etc. The base station 102 can use the cross-channel interference parameter in scheduling resources for the UE 104, as described above.

Figure 7:
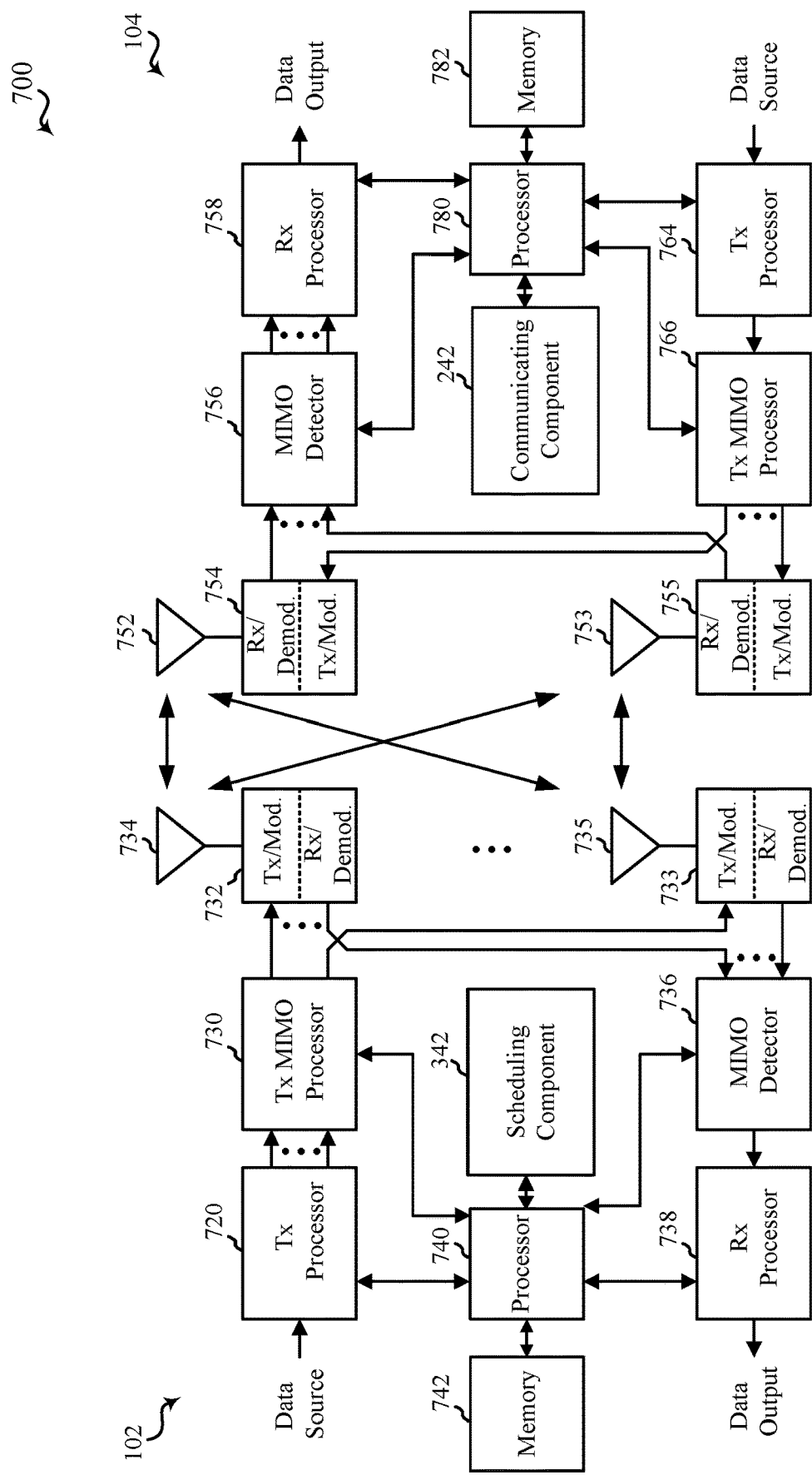
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including determining, by a first UE, a signal measurement of a signal transmitted by a second UE in a first channel, determining, based at least in part on the signal measurement, a cross-channel interference parameter of interference experienced by the first UE in at least a second channel that is within a frequency span of the first channel, and transmitting, by the first UE and to a serving base station that serves the first UE, an indication of the cross-channel interference parameter.

In Aspect 2, the method of Aspect 1 includes wherein determining the cross-channel interference parameter is based at least in part on applying a radiation emission mask specified for the second UE to the signal measurement.

In Aspect 3, the method of any of Aspects 1 or 2 includes wherein the signal measurement corresponds to measuring the signal in the second channel, and determining the cross-channel interference parameter is based on the signal measurement in the second channel.

In Aspect 4, the method of any of Aspects 1 to 3 include wherein determining the cross-channel interference parameter is further based on determining that the first channel is adjacent in frequency to the second channel.

In Aspect 5, the method of Aspect 4 includes wherein determining that the first channel is adjacent in frequency to the second channel includes determining that the first channel is associated with a first PRB that is adjacent in frequency to a second PRB associated with the second channel.

Aspect 6 is a method for wireless communication including determining a cross-channel interference parameter of interference experienced by a first UE in at least a first channel, based on a signal transmitted by a second UE in a second channel, wherein the second channel is within a frequency span of the first channel, and scheduling communications for the first UE based at least in part on the cross-channel interference parameter.

In Aspect 7, the method of Aspect 6 includes receiving, from the first UE, a signal measurement of the signal transmitted by the second UE in the second channel, wherein determining the cross-channel interference parameter is based at least in part on the signal measurement.

In Aspect 8, the method of Aspect 7 includes wherein determining the cross-channel interference parameter is based at least in part on applying a radiation emission mask specified for the second UE to the signal measurement.

In Aspect 9, the method of any of Aspects 7 or 8 include wherein the signal measurement corresponds to measuring the signal in the first channel, and determining the cross-channel interference parameter is based on the signal measurement in the first channel.

In Aspect 10, the method of any of Aspects 7 to 9 include wherein determining the cross-channel interference parameter further comprises determining, based at least in part on the signal measurement, a second cross-channel interference parameter of interference experienced by the first UE in at least a third channel that is also adjacent in frequency to the second channel and does not include the first channel, wherein scheduling communications for the first UE is further based at least in part on the second cross-channel interference parameter.

In Aspect 11, the method of Aspect 10 includes wherein determining the second cross-channel interference parameter is based at least in part on applying a radiation emission mask specified for the second UE to the signal measurement.

In Aspect 12, the method of any of Aspects 10 or 11 include wherein the signal measurement corresponds to measuring the signal in the third channel, and determining the second cross-channel interference parameter is based on the signal measurement in the third channel.

In Aspect 13, the method of any of Aspects 6 to 12 include wherein determining the cross-channel interference parameter comprises receiving the cross-channel interference parameter from the first UE.

In Aspect 14, the method of any of Aspects 6 to 13 include wherein scheduling communications for the first UE comprises refraining from scheduling communications for the first UE over resources in a time domain where the second UE is scheduled to transmit communications over the second channel.

In Aspect 15, the method of any of Aspects 6 to 14 include scheduling communications for the first UE over the first channel in resources of a time domain, and refraining from scheduling, based on the cross-channel interference parameter, the second UE for communications over the second channel in the resources of the time domain.

In Aspect 16, the method of any of Aspects 6 to 15 include wherein determining the cross-channel interference parameter is further based on determining that the first channel is adjacent in frequency to the second channel.

In Aspect 17, the method of Aspect 16 includes wherein determining that the first channel is adjacent in frequency to the second channel includes determining that the first channel is associated with a first physical resource block (PRB) that is adjacent in frequency to a second PRB associated with the second channel.

Aspect 18 is an apparatus for wireless communication including a transceiver, a memory configured to store instructions, and one or more processors communicatively coupled with the memory and the transceiver, wherein the one or more processors are configured to perform one or more of the methods of any of Aspects 1 to 15.

Aspect 19 is an apparatus for wireless communication including means for performing one or more of the methods of any of Aspects 1 to 15.

Aspect 20 is a computer-readable medium including code executable by one or more processors for wireless communications, the code including code for performing one or more of the methods of any of Aspects 1 to 15.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
    receiving, by a first user equipment (UE) and from a serving base station that serves the first UE, a request for the first UE to measure a signal transmitted by a second UE in a first channel for cross-channel interference measurement;
    determining, by the first UE, a signal measurement of the signal transmitted by the second UE in the first channel for cross-channel interference measurement;
    determining, based at least in part on the signal measurement, a cross-channel interference parameter of interference experienced by the first UE in at least a second channel that is within a frequency span of the first channel, wherein the second channel is a sidelink channel, and where the second channel is different from the first channel; and
    transmitting, by the first UE and to the serving base station that serves the first UE, an indication of the cross-channel interference parameter.

2. The method of claim 1, wherein determining the cross-channel interference parameter is based at least in part on applying a first radiation emission mask specified for the second UE to the signal measurement.

3. The method of claim 1, wherein the signal measurement corresponds to measuring the signal in the second channel, and determining the cross-channel interference parameter is based on the signal measurement in the second channel.

4. The method of claim 1, wherein determining the cross-channel interference parameter is further based on determining that the first channel is adjacent in frequency to the second channel.

5. The method of claim 4, wherein determining that the first channel is adjacent in frequency to the second channel includes determining that the first channel is associated with a first physical resource block (PRB) that is adjacent in frequency to a second PRB associated with the second channel.

6. A method for wireless communication, comprising:
    transmitting, to a first user equipment (UE) and from a base station that serves the first UE, a request for the first UE to measure a signal transmitted by a second UE in a second channel for cross-channel interference measurement;

determining a cross-channel interference parameter of interference experienced by the first UE in at least a first sidelink channel, based on the signal transmitted by the second UE in the second channel for cross-channel interference measurement, wherein the second channel is within a frequency span of the first sidelink channel, and wherein the second channel is different from the first sidelink channel; and scheduling, by a base station, communications for the first UE based at least in part on the cross-channel interference parameter.

7. The method of claim 6, further comprising receiving, by the base station and from the first UE, a signal measurement of the signal transmitted by the second UE in the second channel, wherein determining the cross-channel interference parameter is based at least in part on the signal measurement.

8. The method of claim 6, wherein determining the cross-channel interference parameter comprises receiving the cross-channel interference parameter from the first UE.

9. The method of claim 6, wherein scheduling communications for the first UE comprises refraining from scheduling communications for the first UE over resources in a time domain during which the second UE is scheduled to transmit communications over the second channel.

10. The method of claim 6, further comprising:
scheduling communications for the first UE over the first sidelink channel in first resources that are in a period of time in a time domain; and
refraining from scheduling, based on the cross-channel interference parameter, the second UE for communications over the second channel in second resources that are in the period of time in the time domain.

11. The method of claim 6, wherein determining the cross-channel interference parameter is further based on determining that the first sidelink channel is adjacent in frequency to the second channel.

12. The method of claim 7, wherein determining the cross-channel interference parameter is based at least in part on applying a first radiation emission mask specified for the second UE to the signal measurement.

13. The method of claim 7, wherein the signal measurement corresponds to measuring the signal in the first sidelink channel, and wherein determining the cross-channel interference parameter is based on the signal measurement in the first sidelink channel.

14. The method of claim 7, wherein determining the cross-channel interference parameter further comprises determining, based at least in part on the signal measurement, a second cross-channel interference parameter of interference experienced by the first UE in at least a third channel that is also adjacent in frequency to the second channel and does not include the first sidelink channel, wherein scheduling communications for the first UE is further based at least in part on the second cross-channel interference parameter.

15. The method of claim 11, wherein determining that the first sidelink channel is adjacent in frequency to the second channel includes determining that the first sidelink channel is associated with a first physical resource block (PRB) that is adjacent in frequency to a second PRB associated with the second channel.

16. The method of claim 14, wherein determining the second cross-channel interference parameter is based at least in part on applying a radiation emission mask specified for the second UE to the signal measurement.

17. The method of claim 14, wherein the signal measurement corresponds to measuring the signal in the third channel, and determining the second cross-channel interference parameter is based on the signal measurement in the third channel.

18. An apparatus for wireless communication, comprising:
a transceiver;
a memory configured to store instructions; and
one or more processors communicatively coupled with the memory and the transceiver, wherein the one or more processors are configured to:
receive, from a serving base station that serves the apparatus, a request for the apparatus to measure a signal transmitted by a device in a first channel for cross-channel interference measurement;
determine a signal measurement of the signal transmitted by the device in the first channel for cross-channel interference measurement;
determine, based at least in part on the signal measurement, a cross-channel interference parameter of interference experienced by the apparatus in at least a second channel that is within a frequency span of the first channel, wherein the second channel is a sidelink channel, and wherein the second channel is different from the first channel; and
transmit, to the serving base station that serves the apparatus, an indication of the cross-channel interference parameter.

19. The apparatus of claim 18, wherein the one or more processors are configured to determine the cross-channel interference parameter based at least in part on applying a first radiation emission mask specified for the device to the signal measurement.

20. The apparatus of claim 18, wherein the signal measurement corresponds to measuring the signal in the second channel, and wherein the one or more processors are configured to determine the cross-channel interference parameter based on the signal measurement in the second channel.

21. The apparatus of claim 18, wherein the one or more processors are configured to determine the cross-channel interference parameter further based on determining that the first channel is adjacent in frequency to the second channel.

22. The apparatus of claim 21, wherein the one or more processors are configured to determine that the first channel is adjacent in frequency to the second channel at least in part by determining that the first channel is associated with a first physical resource block (PRB) that is adjacent in frequency to a second PRB associated with the second channel.

23. An apparatus for wireless communication, comprising:
a transceiver;
a memory configured to store instructions; and
one or more processors communicatively coupled with the memory and the transceiver, wherein the one or more processors are configured to:
transmitting, to a first user equipment (UE) served by the apparatus, a request for the first UE to measure a signal transmitted by a second UE in a second channel for cross-channel interference measurement;
determine a cross-channel interference parameter of interference experienced by the first UE in at least a first sidelink channel, based on the signal transmitted by the second UE in the second channel for cross-channel interference measurement, wherein the second channel is within a frequency span of the first sidelink channel, and wherein the second channel is different from the first sidelink channel; and schedule communications for the first UE based at least in part on the cross-channel interference parameter.

24. The apparatus of claim 23, wherein the one or more processors are further configured to receive, from the first UE, a signal measurement of the signal transmitted by the second UE in the second channel, wherein the one or more processors are configured to determine the cross-channel interference parameter based at least in part on the signal measurement.

25. The apparatus of claim 23, wherein the one or more processors are configured to determine the cross-channel interference parameter at least in part by receiving the cross-channel interference parameter from the first UE.

26. The apparatus of claim 23, wherein the one or more processors are configured to schedule communications for the first UE at least in part by refraining from scheduling communications for the first UE over resources in a time domain during which the second UE is scheduled to transmit communications over the second channel.

27. The apparatus of claim 24, wherein the one or more processors are configured to determine the cross-channel interference parameter based at least in part on applying a first radiation emission mask specified for the second UE to the signal measurement.

28. The apparatus of claim 24, wherein the signal measurement corresponds to measuring the signal in the first sidelink channel, and wherein the one or more processors are configured to determine the cross-channel interference parameter based on the signal measurement in the first sidelink channel.

29. The apparatus of claim 24, wherein the one or more processors are configured to determine the cross-channel interference parameter at least in part by determining, based at least in part on the signal measurement, a second cross-channel interference parameter of interference experienced by the first UE in at least a third channel that is also adjacent in frequency to the second channel and does not include the first sidelink channel, wherein the one or more processors are configured to schedule communications for the first UE further based at least in part on the second cross-channel interference parameter.

30. The apparatus of claim 29, wherein the one or more processors are configured to determine the second cross-channel interference parameter based at least in part on applying a radiation emission mask specified for the second UE to the signal measurement.

* * * * *